(12) United States Patent
Cooksey et al.

(10) Patent No.: US 9,996,363 B2
(45) Date of Patent: Jun. 12, 2018

(54) METHODS OF AND APPARATUS FOR DISPLAYING WINDOWS ON A DISPLAY

(75) Inventors: Tom Cooksey, Cambridge (GB); Jon Erik Oterhals, Trondheim (NO); Jørn Nystad, Trondheim (NO); Lars Ericsson, Cambridge (GB); Eivind Liland, Trondheim (NO); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 149 days.

(21) Appl. No.: 13/435,733

(22) Filed: Mar. 30, 2012

(65) Prior Publication Data
US 2012/0268480 A1 Oct. 25, 2012

(30) Foreign Application Priority Data
Apr. 4, 2011 (GB) .................................. 1105716.3

(51) Int. Cl.
| | |
|---|---|
| *G06T 17/00* | (2006.01) |
| *G06F 9/44* | (2018.01) |
| *G06T 1/60* | (2006.01) |
| *G09G 5/14* | (2006.01) |
| *G09G 5/393* | (2006.01) |
| *G09G 5/397* | (2006.01) |

(52) U.S. Cl.
CPC ............ *G06F 9/4443* (2013.01); *G06F 9/451* (2018.02); *G06T 1/60* (2013.01); *G09G 5/14* (2013.01); *G09G 5/393* (2013.01); *G09G 5/397* (2013.01); *G09G 2310/04* (2013.01);
(Continued)

(58) Field of Classification Search
None
See application file for complete search history.

(56) References Cited

U.S. PATENT DOCUMENTS

| | | | |
|---|---|---|---|
| 5,181,131 A | 1/1993 | Yamazaki et al. | |
| 5,241,656 A * | 8/1993 | Loucks et al. | ................ 715/794 |
| 5,686,934 A | 11/1997 | Nonoshita et al. | |

(Continued)

FOREIGN PATENT DOCUMENTS

| | | |
|---|---|---|
| CN | 1834890 | 9/2006 |
| CN | 101116341 | 1/2008 |

(Continued)

OTHER PUBLICATIONS

Combined Search and Examination Report, dated Jul. 27, 2012 in United Kingdom application No. GB1205846.7.
(Continued)

*Primary Examiner* — Barry Drennan
*Assistant Examiner* — Khoa Vu
(74) *Attorney, Agent, or Firm* — Nixon & Vanderhye P.C.

(57) ABSTRACT

In a compositing window system, as a respective version of the window for an application is written into a window buffer, a corresponding set of per tile signatures indicative of the content of each respective tile in the window buffer is generated and stored. When an updated version of the window is stored into a window buffer, the set of signature values for the updated version is compared to the set of signature values for the previous version in the window buffer to determine which tiles' content has changed. The set of tiles found to have changed is used to generate a set of regions for a window compositor to write to a window in a display frame buffer to update the window in the display frame buffer to display the new version of the window.

19 Claims, 7 Drawing Sheets

(52) U.S. Cl.
CPC ... *G09G 2320/103* (2013.01); *G09G 2340/10* (2013.01); *G09G 2360/122* (2013.01)

(56) References Cited

U.S. PATENT DOCUMENTS

| | | | |
|---|---|---|---|
| 6,069,611 A | 5/2000 | Flynn et al. | |
| 6,075,523 A | 6/2000 | Simmers | |
| 6,094,203 A | 7/2000 | Desormeaux | |
| 6,101,222 A | 8/2000 | Dorricott | |
| 6,304,606 B1 | 10/2001 | Murashita et al. | |
| 6,825,847 B1 | 11/2004 | Molnar et al. | |
| 7,190,284 B1 | 3/2007 | Dye et al. | |
| 7,671,873 B1 | 3/2010 | Pierini et al. | |
| 8,254,685 B2 | 8/2012 | Greene et al. | |
| 8,749,711 B2 | 6/2014 | Um | |
| 2002/0036616 A1 | 3/2002 | Inoue | |
| 2003/0080971 A1* | 5/2003 | Hochmuth et al. | 345/619 |
| 2004/0141613 A1 | 7/2004 | Hayashi | |
| 2005/0168471 A1* | 8/2005 | Paquette | G09G 5/14 345/536 |
| 2005/0285867 A1 | 12/2005 | Brunner et al. | |
| 2006/0050976 A1 | 3/2006 | Molloy | |
| 2006/0152515 A1 | 7/2006 | Lee et al. | |
| 2006/0188236 A1 | 8/2006 | Kitagawa | |
| 2006/0203283 A1 | 9/2006 | Fujimoto | |
| 2007/0005890 A1 | 1/2007 | Gabel et al. | |
| 2007/0083815 A1 | 4/2007 | Delorme et al. | |
| 2007/0146380 A1 | 6/2007 | Nystad et al. | |
| 2007/0188506 A1 | 8/2007 | Hollevoet et al. | |
| 2007/0257925 A1* | 11/2007 | Brunner et al. | 345/545 |
| 2007/0261096 A1 | 11/2007 | Lin et al. | |
| 2007/0273787 A1 | 11/2007 | Ogino et al. | |
| 2008/0002894 A1* | 1/2008 | Hayon et al. | 382/232 |
| 2008/0059581 A1 | 3/2008 | Pepperell | |
| 2008/0143695 A1 | 6/2008 | Juenemann et al. | |
| 2009/0033670 A1 | 2/2009 | Hochmuth et al. | |
| 2009/0202176 A1 | 8/2009 | Hwang et al. | |
| 2010/0058229 A1 | 3/2010 | Mercer | |
| 2010/0332981 A1 | 12/2010 | Lipton et al. | |
| 2011/0074765 A1 | 3/2011 | Oterhals et al. | |
| 2011/0074800 A1 | 3/2011 | Stevens et al. | |
| 2011/0102446 A1 | 5/2011 | Oterhals et al. | |
| 2012/0092451 A1* | 4/2012 | Nystad et al. | 348/43 |
| 2012/0176386 A1* | 7/2012 | Hutchins | 345/522 |
| 2012/0206461 A1* | 8/2012 | Wyatt et al. | 345/501 |
| 2012/0268480 A1 | 10/2012 | Cooksey et al. | |
| 2012/0293545 A1 | 11/2012 | Engh-Halstvedt et al. | |
| 2013/0067344 A1 | 3/2013 | Ungureanu et al. | |

FOREIGN PATENT DOCUMENTS

| | | |
|---|---|---|
| EP | 1 035 536 A2 | 9/2000 |
| EP | 1 484 737 A1 | 12/2004 |
| JP | 63-298485 | 12/1988 |
| JP | 05266177 A | 3/1992 |
| JP | 5-227476 | 9/1993 |
| JP | 5-266177 | 10/1993 |
| JP | 11-328441 | 11/1999 |
| JP | 11-355536 | 12/1999 |
| JP | 2004-510270 | 4/2004 |
| JP | 2005-195899 | 7/2005 |
| JP | 2006-268839 | 10/2006 |
| JP | 2007-81760 | 3/2007 |
| JP | 2007-531355 | 11/2007 |
| WO | WO 02/27661 A2 | 4/2002 |
| WO | WO 2005/055582 A2 | 6/2005 |
| WO | WO 2008/026070 | 3/2008 |

OTHER PUBLICATIONS

U.S. Appl. No. 12/588,459, of Oterhals et al., filed Oct. 15, 2009.
U.S. Appl. No. 12/588,461, of Stevens et al., filed Oct. 15, 2009.
U.S. Appl. No. 12/923,518, of Oterhals et al., filed Sep. 24, 2010.
Chinese First Office Action dated Jun. 11, 2014 in CN 201010294392.9 and English translation, 17 pages.
English Translation of Japanese Official Action dated Apr. 7, 2014 in Japanese Application No. 2010-213508.
Bergsagel, Jonathan, et al., "Super high resolution displays empowered by the OMAP4470 mobile processor: WUXGA resolution tablets now becoming a reality for the Android ecosystem", Texas Instruments, Dallas, Texas, 2012, pp. 1-16.
Khan, Moinul H., et al., "Bandwidth-efficient Display Controller for Low Power Devices in Presence of Occlusion", Consumer Electronics, ICCE 2007, Digest of Technical Papers, International Conference on Jan. 10-14, 2007 (2 pages).
Park, Woo-Chan, et al., "Order Independent Transparency for Image Composition Parallel Rendering Machines", P.-C. Yew and J. Xue (Eds.): A CSA 2004, LNCS 3189, pp. 449-460.
Heade, T., et al., "HDR Image Composition and Tone Mapping on the Cell Processor", MSc Interactive Entertainment Technology, Trinity College Dublin, Graphic Vision and Visualisation GV2 group (8 pages).
"Quick look at the Texas Instruments TI OMAP 4470 CPU, Kindle Fire HD CPU", Arctablet News, 2014 Arctablet Blog, pp. 1-7.
"Composition Processing Cores (CPC)", http://www.vivantecorp.com/index.php/en/technology/composition.html.
U.S. Appl. No. 14/032,481, filed Sep. 20, 2013, Croxford et al.
U.S. Appl. No. 14/255,395, filed Apr. 17, 2014, Croxford et al.
U.S. Office Action issued in U.S. Appl. No. 12/923,518 dated Jul. 18, 2014.
U.S. Office Action issued in U.S. Appl. No. 12/588,461 dated Jul. 22, 2014.
Japanese Office Action issued in Japanese Patent Application No. 2010-213509 dated Jun. 23, 2014 (w/ translation)—7 pp.
Chinese First Office Action dated Jul. 31, 2014 in CN 201010294382.5 and English translation, 54 pages.
U.S. Appl. No. 14/032,481, filed Sep. 20, 2013; Inventor; Croxford et al.
Japanese Office Action dated Apr. 7, 2014 in Japanese Application No. 2010-213508.
Combined Search and Examination Report, Jan. 26, 2011, in corresponding European Application No. GB1016165.1.
Arctablet (http://www.arctablet.com/blog . . . ) 2010, 12 pages.
Final Rejection dated Jul. 2, 2013 in co-pending U.S. Appl. No. 12/588,459.
Final Rejection dated Feb. 24, 2015 in co-pending U.S. Appl. No. 12/588,461.
Non-final Rejection dated Dec. 26, 2014 in co-pending U.S. Appl. No. 12/923,518.
Vesa Digital Packet Video Link Standard, Video Electronics Standards Association, Version 1, Apr. 18, 2004, 86 pages.
Notice of Allowance dated Jul. 7, 2015 in co-pending U.S. Appl. No. 14/032,481 24 pages.
Notice of Allowance dated Jul. 20, 2015 in co-pending U.S. Appl. No. 14/255,395 24 pages.
Final Office dated Jul. 29, 2015 in co-pending U.S. Appl. No. 13/898,510 28 pages.
Final Office dated Aug. 7, 2015 in co-pending U.S. Appl. No. 12/923,518 27 pages.
Office Action dated Mar. 24, 2015 in U.S. Appl. No. 13/898,510, 35 pages.
Office Action dated Dec. 19, 2017 in co-pending U.S. Appl. No. 15/254,280, 20 pages.
XDamage Extension, http://www.freedesktop.org.wiki/Software/XDamage?action=print, last edited May 18, 2013, 2 pages.
Creating a polygon shape from a 2d tile array, mhtml://X:\Documents and Settings\jtothill.DEHNS.002\Local Settings\Temporar . . . , last edited Oct. 5, 2009, 3 pages.
Android-eepc/base, https://gitorious.org/android-eepc/base/source/. . . , 2007©, 9 pages.
"Qt source code", 2013©, 264 pages https://qt.gitorious.org/gt/gt/source/427e398a7b7f3345fb4dcbc275b3ea29f211851b:src/gui/kernel/qwidget.cpp.
EGL (OpenGL), http://en.wikipedia.org/wiki/EGL_(OpenGL), last edited Sep. 21, 2012.
U.S. Appl. No. 12/923,517, filed Sep. 24, 2010; Inventor: Croxford et al.

(56) References Cited

OTHER PUBLICATIONS

U.S. Appl. No. 13/898,510, filed May 21, 2013; Inventor: Croxford et al.
Office Action dated Feb. 21, 2012 in U.S. Appl. No. 12/588,459, pp. 1-29.
Office Action dated Aug. 29, 2012 in U.S. Appl. No. 12/588,459, pp. 1-29.
Office Action dated Jan. 22, 2013 in U.S. Appl. No. 12/588,459, pp. 1-20.
Office Action dated Jun. 20, 2013 in U.S. Appl. No. 12/588,459, pp. 1-26.
Office Action dated Jul. 2, 2013 in U.S. Appl. No. 12/588,459, pp. 1-24.
Office Action dated Feb. 17, 2012 in U.S. Appl. No. 12/588,461, pp. 1-20.
Office Action dated Aug. 30, 2012 in U.S. Appl. No. 12/588,461, pp. 1-22.
Office Action dated Jun. 5, 2013 in U.S. Appl. No. 12/588,461, pp. 1-20.
Office Action dated Dec. 3, 2013 in U.S. Appl. No. 12/588,461, pp. 1-18.
Office Action dated Nov. 8, 2013 in U.S. Appl. No. 12/923,518, pp. 1-18.
Office Action dated Nov. 21, 2013 in U.S. Appl. No. 12/923,517, pp. 1-21.
Shim et al., *A Compressed Frame Buffer to Reduce Display Power Consumption in Mobile Systems*, IEEE, Asia and South Pacific Design Automation Conference (ASP-DAC'04) pp. 1-6, Jan. 2004.
Shim, *Low-Power LCD Display Systems*, School of Computer Science and National University, Korea, Aug. 2006.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
United Kingdom Search Report in United Kingdom Application No. GB 0916924.4, dated Jan. 15, 2010.
UK Combined Search and Examination Report dated Jan. 26, 2011 in GB 1016162.8.
UK Combined Search and Examination Report dated Jan. 26, 2011 in GB 1016165.1.
UK Combined Search and Examination Report dated Jul. 27, 2012 in GB 1205846.7.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Sustems, Aug. 12-14, 2002, Monterey, California, pp. 112-117.
Iyer et al., Energy-Adaptive Display System Designs for Future Mobile Environments, HP Laboratories Palto Alto, Apr. 23, 2003.
Carts-Powell, Cholesteric LCDs Show Images After Power is Turned Off; OptoIQ, Sep. 1, 1998.
Zhong et al., Energy Efficiency of Handheld Computer Interfaces Limits, Characterization and Practice. Jun. 2005.
Patel et al., Frame Buffer Energy Optimization by Pixel Prediction, Proceedings of the 2005 International Conference on Computer Design, Jun. 2005.
R. Patel et al., Parallel Lossless Data Compression on the GPU, 2012 IEEE, 10 pages, In Proceedings of Innovative Parallel Computing (InPar '12). May 13-14, 2012. San Jose, California.
Smalley, ATI's Radeon X800 Series Can Do Transparency AA Too, Sep. 29, 2005.
Esselbach, Adaptive Anti-Aliasing on ATI Radeon X800 Boards Investigated, Oct. 17, 2005.
Digital Visual Interface DVI, Revision 1.0, Digital Display Working Group, Apr. 2, 1999, pp. 1-76.
Ma, OLED Solution for Mobile Phone Subdisplay, Apr. 2003.
Z. Ma et al., Frame Buffer Compression for Low-Power Video Coding, 2011 $18^{th}$ IEEE International Conference on Image Processing, 4 pages, Date of conference: Sep. 11-14, 2011.
M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.
T.L. Bao Yng et al., Low Complexity, Lossless Frame Memory Compression Using Modified Hadamard Transform and Adaptive Golomb-Rice Coding, IADIS International Conference Computer Graphics and Visualization 2008, Jul. 15, 2008, pp. 89-96.
A.J. Penrose, Extending Lossless Image Compression, Technical Report No. 526, Dec. 2001, pp. 1-149.
M. Ferretti et al., A Parallel Pipelined Implementation of LOCO-I for JPEG-LS, 4 pages; Date of conference: Aug. 23-26, 2004.
Jbarnes' braindump:: Intel display controllers; Jan. 26, 2011; http://virtuousgeek.org/blog/index.php/jbarnes/2011/01/26/intel_display_controllers; 5 pages, Jan. 26, 2011.
Quick Look at the Texas Instruments TI OMAP 4470 CPU, Kindle Fire HD CPU, http://www.arctablet.com/blog/featured/quick-look-texas-instruments-ti-omap-4470-cpu; posted Sep. 6, 2012 in Archos Gen10 CPU TI OMAP TI OMAP 4470; 12 pages; Sep. 6, 2012.

* cited by examiner

METHODS OF AND APPARATUS FOR DISPLAYING WINDOWS ON A DISPLAY

CROSS REFERENCE TO RELATED APPLICATIONS

The disclosure of U.S. patent application Ser. No. 12/588,459 filed on 15 Oct. 2009, Ser. No. 12/588,461 filed on 15 Oct. 2009 and Ser. No. 12/923,518 filed on 24 Sep. 2010, each of which is incorporated herein by reference.

BACKGROUND

The technology described herein relates to methods of and apparatus for displaying windows, e.g., for a graphical user interface, on a display, and in particular to methods and apparatus for use when composing windows in a compositing window system.

As is known in the art, many electronic devices and systems use windows for displaying information, such as a graphical user interface, game, demo, etc., to a user on a display screen (and for allowing a user to interact with an application or applications being executed). A common way of displaying such windows is to use a so-called compositing window system, in which the individual windows are first stored in (rendered to) respective window buffers, and then the individual window buffers (i.e. their content) are combined appropriately into a unified frame buffer for the display in question in order to display the windows to the user.

While such compositing window systems are generally believed to be preferable to systems where each window is rendered to the frame buffer directly, they can still require significant resources in order to be able to blend the different windows stored in the window buffers into the frame buffer appropriately.

The Applicants believe therefore that there remains scope for improvements to systems for displaying windows on a display.

BRIEF DESCRIPTION OF THE DRAWINGS

A number of embodiments of the technology described herein will now be described by way of example only and with reference to the accompanying drawings, in which.

Like reference numerals are used for like features in the Figures where appropriate.

DETAILED DESCRIPTION

Figure 1:
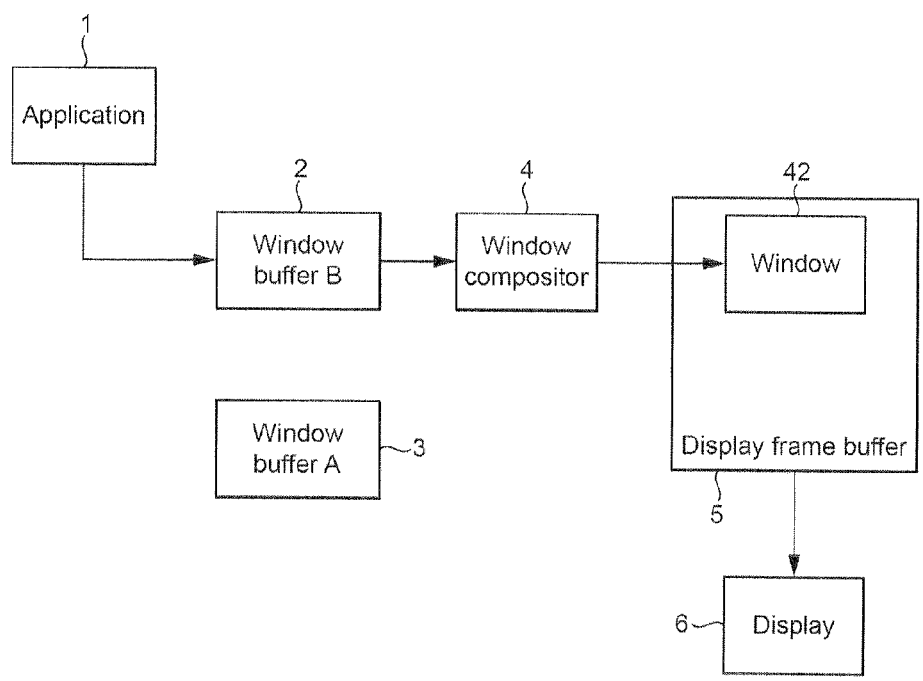
FIG. 1 shows schematically the operation of a compositing window system for displaying windows on a display.

A first embodiment of the technology described herein comprises a method of displaying windows on a display in which a window to be displayed is first written to a window buffer for storing the window when the window is generated and then written therefrom to a frame buffer for display, the method comprising:

when a new version of a window to be displayed is generated and stored in a window buffer:

comparing the new version of the window to the version of the window that has been written to the frame buffer to show the window in its current form on the display;

using the comparison to identify regions of the window that have changed in the new version of the window; and determining the regions of the new version of the window to write to the frame buffer in order to display the new version of the window on the display on the basis of those regions of the new version of the window that have been identified as having changed using the comparison.

A second embodiment of the technology described herein comprises an apparatus for displaying windows on a display in which a window to be displayed is first written to a window buffer for storing the window when the window is generated and then written therefrom to a frame buffer for display, the apparatus comprising:

means for, when a new version of a window to be displayed is generated and stored in a window buffer, comparing the new version of the window to the version of the window that has been written to the frame buffer to show the window in its current form on the display;

means for using the comparison to identify regions of the window that have changed in the new version of the window; and means for determining the regions of the new version of the window to write to the frame buffer in order to display the new version of the window on a display on the basis of those regions of the new version of the window that have been identified as having changed by the means for using the comparison to identify regions of the window that have changed in the new version of the window.

The technology described herein relates to and is implemented in a system in which windows for display to a user (e.g. for a graphical user interface, game, demo, etc.) are written to respective window buffers when they are first generated, and then written therefrom to a frame buffer for display.

However, in the technology described herein, rather than simply writing the entire window buffer to the frame buffer when a new version of a window is generated, the new version of the window that is to be written to the frame buffer is compared to the version of the window that was previously written to the frame buffer to identify those regions of the window that have actually changed, and then the window regions of the new version of the window that are actually written to the frame buffer from the window buffer are selected on the basis of the window regions that have been identified as having changed.

In other words, in the technology described herein, rather than each new version of a window simply being written to the frame buffer from the window buffer in its entirety once it is ready, the new version of the window is instead first compared with the version of the window that was previously written to the frame buffer, and it is then determined how to write the new version of the window to the frame buffer on the basis of that comparison.

As will be discussed further below, the Applicants have found and recognised that this process can be used to reduce significantly the amount of data that will be written to the frame buffer in use, thereby significantly reducing the number of frame buffer transactions and hence the power and memory bandwidth consumption related to the frame buffer writing operation.

For example, by writing only those parts of the window that have been found to have changed to the frame buffer, the amount of write traffic that is required each time a new version of a window is generated can be reduced. In an embodiment this is what is done. The amount of processing, such as blending, if any, that will be needed to display the new version of the window will also correspondingly be reduced.

Similarly, if it is found by the comparison that a region of the window has not changed in the new version of the window then it can be, and in an embodiment is, determined to be unnecessary to write the newly generated version of that region of the window to the frame buffer from the window buffer, thereby eliminating the need for that frame buffer write "transaction" (and processing). (There is no need to write the unchanged parts of a window to the display frame buffer each time, as the display frame buffer will already contain the necessary content (data) to display the unchanged parts of the window correctly.)

Moreover, the Applicants have recognised that it can be a relatively common occurrence for a window to contain regions that do not change from one version to the next (e.g. from one frame to the next), such as much of the user interface for many applications. Thus, by facilitating the ability to identify such unchanged regions and to then avoid writing such regions to the display frame buffer again, a significant saving in write traffic (write transactions) to the frame buffer can be achieved.

Thus the technology described herein can be used to significantly reduce the power consumed and memory bandwidth used for frame buffer operations when displaying windows for a graphical user interface, in effect by facilitating the identification and elimination of unnecessary frame buffer write transactions. This is advantageous in general, and particularly for lower power, such as portable, devices.

Furthermore, the technology described herein identifies the regions of the window that have changed by comparing the previously written and new versions of the window. The Applicants believe that this is a particularly efficient mechanism for identifying those parts of a changed window that need to be written to the frame buffer for display, and is advantageous, for example, when compared to trying to track the parts of a window that have been changed as the window is generated (which could require complex and onerous processing as the window is generated, particularly as the content of the windows (e.g. in terms of the number of primitives being used to generate them) becomes more complex), or to using the application itself to try to indicate the changed regions of the window.

The technology described herein also can be implemented using relatively little on-chip hardware (when implemented in hardware), and doesn't change the frame buffer format. It can also readily be used in conjunction with, and is complementary to, existing frame buffer power reduction schemes, thereby facilitating further power savings if desired.

The frame buffer that the window data is to be written to for display may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well.

In an embodiment the frame buffer is a frame buffer for the graphics processing system that is generating the windows and/or for the display that the windows are to be displayed on.

Similarly, the window buffers that the windows are first written to when they are generated (rendered) may comprise any suitable such buffers and may be configured in any suitable and desired manner in memory. For example, they may be an on-chip buffer or buffers or may be an external buffer or buffers. Similarly, they may be dedicated memory for this purpose or may be part of a memory that is used for other data as well. The window buffers can be, e.g., in any format that the application wants, and may, e.g., be stored in system memory (e.g. in a unified memory architecture), or in graphics memory/VRAM (e.g. in a non-unified memory architecture).

There may be a single window buffer or plural window buffers. In an embodiment there are, and the apparatus comprises, plural, preferably two, window buffers. In this case each new version of the window is preferably written into a different window buffer to the previous version of the window. For example, the new windows may be written to the different window buffers alternately.

Thus, in an embodiment, the new version of the window is stored in a first window buffer, and compared to a version of the window that was previously written to and stored in a different, second window buffer (and that was written from the second window buffer to the frame buffer to show the window in its current form on the display).

The previously written and new versions of the window can be compared in any suitable and desired manner. As discussed above, the previous version of the window is the version of the window that was previously written to the frame buffer to, in effect, generate the window as it currently appears on the display (i.e. that was used to generate the window as it appears in the frame buffer). In other words, the previous version of the window is the version of the window from which the window as it currently stands in the frame buffer has been drawn (generated). The new version of the window is the new version of the window (e.g. that is generated for the next frame to be displayed, and/or in response to a user input) that is written into the window buffer and that is to be used to generate a new version of the window in the frame buffer to replace the existing version of the window in the frame buffer. The windows themselves (the data to display them) will be generated by a graphics processing system, preferably by a dedicated graphics processing unit (graphics processor), as is known in the art. The windows may be, e.g., for a game, a demo, a graphical user interface, etc., as is known in the art.

It should be noted here that while the comparison is to be between the new version of the window and the previous version of the window that has been written to the frame buffer, it will not necessarily be the case that the window data as it is stored in the frame buffer corresponds exactly to the window data as it was stored in the window buffer before it was written to the frame buffer. This is because, for example, there may be some further processing that takes place when the window is written from the window buffer to the frame buffer. For example, the window may be blended with a background image or other windows, or might be subject to a transformation (such as rotation, scaling, etc.), when it is written to the frame buffer from the window buffer. These operations could then mean that the data representing the window that is stored in the frame buffer is not the same as the data that was written to the window buffer. Also, the format of the window buffer may be different to that of the frame buffer. For example, a window buffer will usually contain an alpha-channel (transparency data) to enable it to be composed semi-transparently.

To account for this, in the technology described herein it is the previous version of the window as it existed in the window buffer before it was written to the frame buffer (i.e. the version of the window from which the window in the frame buffer was then drawn (generated)), that is compared with the new version of the window that has been written to its respective window buffer, rather than the data representing the window that is actually stored in the frame buffer that is compared with the new version of the window.

In other words, the technology described herein compares the new "source" window data for the frame buffer (which is what is stored in the window buffer) with the "source" data that was used to generate the current version of the window that is stored in the frame buffer (which previous source data will accordingly correspond to the previous version of the window as stored in the window buffer that was then used to generate the current version of the window in the frame buffer). Thus, the technology described herein compares the source window data for the current version of the window that is in the frame buffer with a new set of source window data to be used to generate the next version of the window in the frame buffer, and if the previous source data is the same as the new source data, will avoid writing the new source data to the frame buffer. Thus, the technology described herein does not use the data that is in the frame buffer for the comparison (it ignores this data), but rather compares the new window data with the "source" window data that was used to generate the data that is in the frame buffer.

This should be contrasted with arrangements that, e.g., compare a new set of data to be written to memory with data that is already stored in that memory (i.e. that in effect compare new "source" data with existing stored "destination" data), to see if they are the same (e.g. to then avoid copying the source data to the destination memory). The technology described herein compares two sets of "source" window data (i.e. old and new "source" window data) (and which may in fact be in completely different buffers), not new "source" data with the already stored "destination" data that it is to (potentially) replace.

Also, as will be appreciated by those skilled in the art, at least where the technology described herein is being used, it could be that the current version of the window in the frame buffer has, in effect, been drawn (generated) from plural previous windows (e.g. where window regions are left unchanged in the frame buffer from one window to the next). Thus, it is the version of the window that was, in effect, used to draw the window as it appears in the frame buffer that is compared with the new version of the window, and not necessarily any particular previous version of the window in its entirety (although in practice, this will be equivalent to comparing the new version of the window with the immediately preceding version of the window as it was written to a window buffer, as the frame buffer should reflect that previous version of the window in any event).

While it would be possible to compare the windows as a whole, in an embodiment, the comparison is done by comparing corresponding regions in each window, preferably to see if they are similar or not. Thus in an embodiment each window is divided into respective sets of sub-regions, and each respective pair of sub-regions (one from each window) is then compared, to determine if that sub-region has changed or not (and then the new version of the sub-region written to the frame buffer or not, on the basis of the comparison). This is a particularly convenient mechanism for determining the regions (parts) of the window that have changed (or not).

Thus, an embodiment of the technology described herein comprises comparing a sub-region of the new version of the window to the corresponding sub-region for the version of the window that has been written to the frame buffer (i.e. from which the window in the frame buffer has been generated), using the comparison to determine whether the sub-region of the window has changed in the new version of the window, and if it has, writing the new version of the sub-region of the window to the frame buffer in order to display the new version of the window on the display. In an embodiment this is repeated for plural sub-regions of the window, and most preferably for each respective sub-region of the window.

Similarly, an embodiment of the technology described herein comprises comparing a sub-region of the new version of the window to the corresponding sub-region for the version of the window that has been written to the frame buffer (i.e. from which the window in the frame buffer has been generated), using the comparison to determine whether the sub-region of the window has changed in the new version of the window, and if it has not changed, not writing the new version of the sub-region of the window to the frame buffer but using the data for the sub-region of the window that is already stored in the frame buffer when displaying the new version of the window on the display. Again, in an embodiment this is repeated for plural sub-regions of the window, and most preferably for each respective sub-region of the window.

The sub-regions of the windows that are considered and compared can each represent any suitable and desired region (area) of the window. So long as the window is divided or partitioned into a plurality of identifiable smaller regions each representing a part of the overall window that can be identified and compared in the manner of the technology described herein, then the sub-division of the window into sub-regions can be done as desired.

In an embodiment the sub-regions correspond to respective blocks of data corresponding to respective parts of the overall array of data that represents the window to be displayed (as is known in the art, the windows will typically be represented as, and stored in the buffers as, arrays of fragment or pixel data).

Each window sub-region (e.g. block of data) in an embodiment represents a different part (sub-region) of the window (data overall array) (although the sub-regions could overlap if desired). Each sub-region (data block) should represent an appropriate portion (area) of the window (data array), such as a plurality of data positions within the window. Suitable sub-region sizes would be, e.g., 8×8, 16×16 or 32×32 data positions in the window data array.

In one embodiment, the windows are divided into regularly sized and shaped sub-regions (e.g. blocks of data), preferably in the form of squares or rectangles. However, this is not essential and other arrangements could be used if desired.

In one embodiment, each window sub-region corresponds to a rendered tile that the graphics processor that is rendering (generating) the windows produces as its rendering output. This is a particularly straightforward way of implementing the technology described herein, as the graphics processor will generate the rendering tiles directly, and so there will be no need for any further processing to "produce" the window sub-regions that will be considered and compared in the manner of the technology described herein. In this case therefore, each rendered tile generated by the graphics processor for a window will be compared with the corresponding rendered tile (i.e. the tile having the same tile position) in the existing version of the window used to generate the frame buffer, and the newly rendered tile then written or not from the window buffer to the frame buffer on the basis of that comparison.

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In these arrangements of the technology described herein, the (rendering) tiles that the windows are divided into for rendering purposes can be any desired and suitable size or shape. The rendering tiles in an embodiment are all the same size and shape, as is known in the art, although this is not essential. In an embodiment, each rendered tile is rectangular, and preferably 8×8, 16×16, or 32×32 sampling positions in size.

In an embodiment, the technology described herein may be, and preferably is, also or instead performed using window sub-regions of a different size and/or shape to the tiles that the rendering process operates on (produces).

For example, in an embodiment, the window sub-regions that are considered and compared in the manner of the technology described herein may be made up of a set of plural "rendering" tiles, and/or may comprise only a sub-portion of a rendering tile. In these cases there may be an intermediate stage that, in effect, "generates" the desired window sub-regions from the rendered tile or tiles that the graphics processor generates.

In one embodiment, the same sub-region configuration (size and shape) is used across the entire window (array of window data). However, in another embodiment, different sub-region configurations (e.g. in terms of their size and/or shape) are used for different regions of a given window. Thus, in one embodiment, different sub-region sizes may be used for different regions of the same window.

In an embodiment, the sub-region configuration (e.g. in terms of the size and/or shape of the sub-regions being considered) can be varied in use. In one embodiment the window sub-region configuration can be adaptively changed in use, for example, and in an embodiment, depending upon the number or rate of frame buffer write transactions that are being eliminated (avoided). For example, and in an embodiment, if it is found that using a particular sub-region size only results in a low probability of a sub-region not needing to be written to the frame buffer, the sub-region size being considered could be changed for subsequent versions of the window (e.g., and in an embodiment, made smaller) to try to increase the probability of avoiding the need to write regions of a new version of the window to the frame buffer.

Where the window sub-region size is varied in use, then that may be done, for example, over the entire window, or over only particular portions of the window, as desired.

It would also and/or instead be possible to configure the window sub-regions on the basis of the window's content, such as, and in an embodiment, on the basis of what is being displayed. For example, each sub-region could correspond to a particular display element or elements in the window, such as a button or buttons, a text input box or boxes, a particular icon or icons, etc.

The comparison of the newly generated version of the window (e.g. of the respective new version of the window sub-region) with the version of the window (of the window sub-region) that has previously been written to the frame buffer should be so as to determine whether the new version is the same as (or at least sufficiently similar to) the previous version or not. This can be done in any suitable and desired manner. Thus, for example, some or all of the content of the new window (or window sub-region) may be compared with some or all of the content of the previous window (or window sub-region) (and in one embodiment this is done).

In an embodiment, the comparison is performed by comparing information representative of and/or derived from the content of the new version of the window (e.g., and in an embodiment, of the window sub-region in question) with information representative of and/or derived from the content of the existing version of the window (e.g., and in an embodiment, of the window sub-region in question), e.g., and in an embodiment, to assess the similarity or otherwise of the windows (window sub-regions).

The information representative of the content of the windows is in an embodiment in the form of information representative of the content of each window sub-region (e.g. rendered tile). This information for each window sub-region (e.g. rendered tile) may take any suitable form, but is in an embodiment based on or derived from the content of the respective window sub-region. In an embodiment it is in the form of a "signature" for the window sub-region which is generated from or based on the content of the window sub-region (e.g. the data block representing the window sub-region). Such a window sub-region content "signature" may comprise, e.g., and in an embodiment, any suitable set of derived information that can be considered to be representative of the content of the window sub-region, such as a checksum, a CRC, or a hash value, etc., derived from (generated for) the data for the window sub-region. Suitable signatures would include standard CRCs, such as CRC32, or other forms of signature such as MD5, SHA-1, etc.

Thus, in an embodiment, a signature indicative or representative of, and/or that is derived from, the content of each window sub-region is generated for each window sub-region that is to be compared, and the comparison process comprises comparing the signatures of the respective window sub-regions.

Thus, in an embodiment, when the system is operating in the manner of the technology described herein, a signature, such as a CRC value, is generated for respective sub-regions for a window (e.g. and in an embodiment, for each rendered tile that is generated for the window). Any suitable "signature" generation process, such as a CRC function or a hash function, can be used to generate the signature for a sub-region. In an embodiment the sub-region (e.g. tile) data is processed in a selected, preferably particular or predetermined, order when generating the signature. This may further help to reduce power consumption. In one embodiment, the data is processed using Hilbert order (the Hilbert curve).

The signatures for the window sub-regions (e.g. rendered tiles) should be stored appropriately, and associated with the versions of the windows to which they relate. In an embodiment they are stored with the window buffers. Then, when the signatures need to be compared, the stored signature for a sub-region can be retrieved appropriately.

Although, as will be appreciated by those skilled in the art, the generation and storage of a signature for window sub-regions (e.g. rendered tiles) will require some processing and memory resource, the Applicants believe that this will be outweighed by the potential savings in terms of power consumption and memory bandwidth that can be provided by the technology described herein.

It would, e.g., be possible to generate a single signature for an, e.g., RGBA, window sub-region (e.g. rendered tile), or a separate signature (e.g. CRC) could be generated for each colour plane. Similarly, colour conversion could be performed and a separate signature generated for the Y, U, V planes if desired.

As will be appreciated by those skilled in the art, the longer the signature that is generated for a window sub-region is (the more accurately the signature represents the sub-region), the less likely there will be a false "match" between signatures (and thus, e.g., the erroneous non-writing of a new window sub-region to the frame buffer). Thus, in general, a longer or shorter signature (e.g. CRC) could be used, depending on the accuracy desired (and as a trade-off relative to the memory and processing resources required for the signature generation and processing, for example).

In an embodiment, the signature is weighted towards a particular aspect of the window's content as compared to other aspects of the window's content (e.g., and in an embodiment, to a particular aspect or part of the data for the window sub-region (the data representing the sub-region's content)). This may allow, e.g., a given overall length of signature to provide better overall results by weighting the signature to those parts of the content (data) that will have more effect on the overall output (e.g. as perceived by a viewer of the window).

In an embodiment, a longer (more accurate) signature is generated for the MSB bits of a colour as compared to the LSB bits of the colour. (In general, the LSB bits of a colour are less important than the MSB bits, and so the Applicants have recognised that it may be acceptable to use a relatively inaccurate signature for the LSB bits, as errors in comparing the LSB bits for different window sub-regions (e.g. rendered tiles) will, the Applicants believe, have a less detrimental effect on the overall output.)

It would also be possible to use different length signatures for different applications, etc., depending upon the, e.g., application's, e.g., display, requirements. This may further help to reduce power consumption. Thus, in an embodiment, the length of the signature that is used can be varied in use. In an embodiment the length of the signature can be changed depending upon the application that a window relates to (can be tuned adaptively depending upon the application that is in use).

Thus, an embodiment of the technology described herein comprises comparing a signature representative of the content of a sub-region (e.g. a rendered tile) of a new version of a window to be displayed with the signature generated from the window buffer for the corresponding window sub-region (e.g. tile) that has already been written to the frame buffer, and if the signatures are the same, not writing the new window sub-region (e.g. tile) to the frame buffer (but if the signatures differ, writing the new sub-region (e.g. tile) to the frame buffer). This is in an embodiment repeated for plural sub-regions of the window and preferably for each sub-region that the window is divided into.

The comparison process may, e.g., require an exact match for the sub-regions to be considered to match such that the new version of the sub-region is not written to the frame buffer, or only a sufficiently similar (but not exact) match, e.g., that exceeds a given threshold, could be required for the sub-regions to be considered to match such that the new sub-region is not written to the frame buffer.

Where the comparison process requires an exact match between sub-regions being compared (e.g. between their signatures) for the sub-regions to be considered to match such that the new sub-region is not written to the frame buffer, then, if one ignores any effects due erroneously matching sub-regions, the technology described herein should provide an, in effect, lossless process. If the comparison process only requires a sufficiently similar (but not exact) match, then the process will be "lossy", in that a sub-region may be substituted by a sub-region that is not an exact match for it.

The sub-regions for the new version of the window to be compared should each be compared with their respective corresponding sub-region for the window that was previously written to the frame buffer (i.e. for the window sub-region that the sub-region that is already in the frame buffer was drawn from), thus for the previous sub-region occupying the same position (the same data block (e.g. tile) position) within the window as the new sub-region). Thus, in an embodiment, a newly generated window sub-region is compared with the equivalent window sub-region from which the window sub-region that is stored in the frame buffer was drawn. This is then in an embodiment repeated for some or all of the sub-regions that the windows are divided into.

In one embodiment, each and every sub-region (e.g. tile) for a window is compared. However, this is not essential, and so in another embodiment, the comparison is carried out in respect of some but not all of the sub-regions of a given window to be displayed.

In an embodiment, the number of window sub-regions that are compared for respective windows is varied, e.g., and preferably, over sequences of windows. This is in an embodiment based on the expected correlation (or not) between successive windows to be generated.

Thus in an embodiment the technology described herein comprises means for or a step of selecting the number of window sub-regions that are to be compared for a given window to be displayed.

In an embodiment, fewer sub-regions are subjected to a comparison when there is (expected to be) little correlation between successive windows (such that, e.g., signatures are generated on fewer sub-regions in that case), whereas more (and in an embodiment all) of the sub-regions for a window are subjected to the comparison stage (and have signatures generated for them) when there is (expected to be) a lot of correlation between successive windows (such that it should be expected that a lot of the sub-regions will be unchanged in the new version of the window). This helps to reduce the amount of comparisons and signature generation, etc., that will be performed (which will consume power and resources) where it might be expected that fewer frame buffer write transactions will be eliminated (where there is little correlation between successive versions of a window), whilst still facilitating the use of the comparison process of the technology described herein where that might be expected to be particularly beneficial (i.e. where there is a lot of correlation between successive versions of a window).

In these arrangements, the amount of (expected) correlation between different (e.g. successive) versions of a window is in an embodiment estimated for this purpose. This can be done as desired, but is in an embodiment based on the correlation between earlier versions of the window. In an embodiment the number of matching sub-regions in previous pairs or sequences of the window (as determined, e.g., and in an embodiment, by comparing the versions of the window in the manner of the technology described herein), and in an embodiment in the immediately preceding versions of the window, is used as a measure of the expected correlation for the current version of the window. Thus, in an embodiment, the number of window sub-regions found to match in the previous version of the window is used to select how many sub-regions in the current version of the window should be compared in the manner of the technology described herein.

In an embodiment, the number of window sub-regions that are compared in the manner of the technology described herein can be, and in an embodiment is, varied as between different regions of the window. In one such arrangement, this is based on the location of previous sub-region matches within a window, i.e. such that an estimate of those regions of a window that are expected to have a high correlation (and vice-versa) is determined and then the number of sub-regions in different regions of the window to be processed in the manner of the technology described herein controlled and selected accordingly. For example, and in an embodiment, the location of previous window sub-region matches may be used to determine whether and which regions of the window are likely to remain the same and the number of sub-regions processed in the manner of the technology described herein then increased in those regions.

In an embodiment, it is possible for the software application that the window relates to, to indicate and control which regions of the window are processed in the manner of the technology described herein, and in particular, and in an embodiment, to indicate which regions of the window the sub-region signature calculation process should be performed for. This would then allow the signature calculation to be "turned off" by the application for regions of the window the application "knows" will be always updated.

This may be achieved as desired. In an embodiment registers are provided that enable/disable window sub-region (e.g. rendered tile) signature calculations for window regions, and the software application then sets the registers accordingly (e.g. via the graphics processor driver). The number of such registers may be chosen, e.g., as a trade-off between the extra logic required for the registers, the desired granularity of control, and the potential savings from being able to disable the signature calculations.

In an embodiment, the system is configured to always write a newly generated sub-region for a window to the frame buffer periodically, e.g., once a second, in respect of each given sub-region (sub-region position). This will then ensure that new data is written into the frame buffer at least periodically for every window region, and thereby avoid, e.g., erroneously matched window sub-regions (e.g. because their signatures happen to match even though their content actually varies) being retained in the frame buffer for more than a given, e.g. desired or selected, period of time.

This may be done, e.g., by simply writing out an entire new window (window output data array) periodically (e.g. once a second). However, in an embodiment, new versions of window regions are written out to the frame buffer individually on a rolling basis, so that rather than writing out a complete new version of a window in one go, a selected portion of the window is written out to the frame buffer each time a new version of the window is generated, in a cyclic pattern so that over time all of the window is eventually written out as new. In one such arrangement, the system is configured such that a (different) selected 1/nth portion (e.g. twenty-fifth) of the window is written out completely each frame, so that by the end of a sequence of n (e.g. 25) frames, all the parts of the window will have been written to the frame buffer completely at least once.

This operation is in an embodiment achieved by disabling the window sub-region comparisons for the relevant window sub-regions (i.e. for those sub-regions that are to be written to the frame buffer in full). (Content signatures are in an embodiment still generated for the sub-regions that are written to the frame buffer in full, as that will then allow those sub-regions to be compared with future window sub-regions.)

In an embodiment, the technology described herein is used in conjunction with another frame (or other output) buffer power and bandwidth reduction scheme or schemes, such as, and in an embodiment, output (e.g. frame) buffer compression (which may be lossy or loss-less, as desired).

The signature generation, where used, may be implemented as desired. For example, it may be implemented in an integral part of the graphics processor that is generating (rendering) the windows for display, or there may, e.g., be a separate "hardware element" that is intermediate the graphics processor and the frame buffer.

In an embodiment, there is a hardware element that does the signature generation (where that is done). Where the window sub-regions that are compared are not the same as the, e.g., rendering tiles that the rendering process produces, this hardware element in an embodiment generates or assembles the sub-regions from the rendered tiles that the rendering process generates. In one embodiment, this hardware element is separate to the graphics processor, and in another embodiment it is integrated in (part of) the graphics processor.

The window comparison process (e.g. window sub-regions comparison) may similarly be implemented as desired. For example, an application and/or a window compositor could carry out this process.

Although the technology described herein has been described above primarily with reference to comparing one newly generated window with the previous window that has been written to the frame buffer, as will be appreciated by those skilled in the art, this process can be, and in an embodiment is, repeated for plural versions of a given window that are being generated (and as they are generated), and most preferably as each successive new version of the window is generated.

Furthermore, where there are plural different source windows being generated for a given frame buffer, the technology described herein can be used for any or all of those windows as desired. Thus, in an embodiment, the technology described herein is applied to each of plural windows that are being generated for a given frame buffer, and, most preferably, in respect of each window that is being generated for a given frame buffer. In this case, each individual window will be processed in the manner of the technology described herein, and then, as is known in the art, the different windows will then be composed into the frame buffer in an appropriate manner.

The writing of the window regions into the frame buffer from the window buffer on the basis of the determination of those window regions that have changed can be implemented in any suitable and desired manner. In an embodiment, the identification of those window regions that have changed is used to determine the region or regions of the window that should be written to the frame buffer, and then information indicating those regions is provided to the frame buffer composing element and/or process (which then writes those regions to the (window in the) frame buffer appropriately).

Thus, in one embodiment the system includes a window compositor for writing window buffers for windows into a display frame buffer, and information indicating which regions of a given window to write to the frame buffer (from the comparison process) is provided to the window compositor, which then writes those regions to the (window in the) frame buffer appropriately. Similarly, in another embodiment the application itself is responsible for writing its own window buffers to the display frame buffer, and the information indicating which regions of the window buffer should be written to the window in the frame buffer is provided to the application appropriately, which then writes those regions to the (window in the) frame buffer appropriately. (The technology described herein extends to arrangements in which the applications themselves are responsible for writing their own window buffers to the frame buffer.)

The writing of the identified regions from the window buffer to the window in the display frame buffer, whether by a window compositor or by an application itself, can be done in any suitable and desired manner. Thus, for example, the window regions could simply be copied into the frame buffer, or more sophisticated techniques, such as alpha-blending, applying some from of geometric transformation (such as rotation, skewing, re-sizing, projecting, etc.), or similar techniques, could be used when writing the window regions from the window buffer to the frame buffer, if desired.

Once a given window or the changed parts of that window have been written to the corresponding window in the frame buffer, then it would be possible to retain that version of the window in a window buffer, for example for comparison with the next version of the window that is generated. However, where, as discussed above, information, such as signatures, representative of the content of the window are used for the comparison process, it is only necessary to retain the "signature" information for the window that has been written to the frame buffer, and not the actual content of that window in a window buffer (since the window buffer's content has already been written to the window in the frame buffer).

Thus, in one embodiment, once the frame buffer contains the new version of a window, that window is allowed to be overwritten in the window buffer. In these cases, however, a set of window region "signatures" (or other information indicative of the content of the window) for the window that was written to the frame buffer (for the window from which the frame buffer has been drawn) is maintained. Thus, in an embodiment, two sets of "content" signatures (or other information indicative of the content of a window) are maintained, one set for the window that was used to generate the window as it exists in the frame buffer, and another set for the new version of the window that has been written to a window buffer. These two sets of signatures (or other information) are then compared, as discussed above, to determine those regions of the new window that should be written to the window in the frame buffer.

Furthermore, as the window in the frame buffer is updated with the new version of the window, the set of signatures or other content-indicating information for the window that was used to generate the window as it exists in the frame buffer is in an embodiment correspondingly updated with the new signatures (or other content indicating information) for the regions of the new version of the window that are being written to the frame buffer. This could either be done, for example, by updating the signature (or other content indicating information) in the set of that information for the window that was used to generate the window that is in the frame buffer for those regions of the window that have been updated in the frame buffer only, or, for example, the complete set of signatures (or other content-indicating information) for the new version of the window could simply be retained as, or copied to, the set of signatures, etc., for the version of the window that was used to generate the window that is in the frame buffer.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. Similarly, the display that the windows are to be displayed on can be any suitable such display, such as a display screen of an electronic device, a monitor for a computer, etc.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and renderer, such as processors having a "pipelined" rendering arrangement (in which case the renderer will be in the form of a rendering pipeline). It is particularly applicable to tile-based graphics processors and graphics processing systems.

It will also be appreciated by those skilled in the art that all of the described embodiments of the technology described herein can include, as appropriate, any one or more or all of the preferred and optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described. These embodiments will be described primarily with reference to the comparison of rendered tiles generated by a tile-based graphics processor in the manner of the technology described herein, although as noted above, the technology described herein is not limited to such arrangements.

As discussed above, the technology described herein relates to compositing window systems, in which the contents of windows to be displayed on a display, e.g., for a graphical user interface, are first drawn into "off-screen" memory buffers (window buffers) the size of the window, and then written to the frame buffer for the display to be displayed.

FIG. 1 illustrates this process and shows schematically the generation of windows for an application 1 such as a game, productivity application (e.g. word-processor, spreadsheet), etc., to be displayed on a display 6. The display 6 may be any suitable form of electronic display, such as a screen of a monitor for a personal computer, a screen of a device such as a phone, tablet, PDA, etc.

As shown in FIG. 1, as successive versions of a window to be displayed are generated, they are written into respective window buffers 2, 3. In this embodiment, the window buffer A 3 is assumed to contain the previous version of the window that has been used to draw the current version of the window 42 as it appears in the frame buffer 5, and the next version of the window that is generated when the window needs to be updated (for example due to user interaction) is written into a different window buffer B 2. The window buffers 2, 3 are read by a window compositor 4 and written to the frame buffer 5 for the display for display. This writing can, as is known in the art, involve, for example, blending the window with other windows, applying some form of geometric transformation to the window as it is written from the window buffer to the frame buffer, etc., and/or just be an opaque copy. When a window needs to be updated (for example due to user interaction), the window is redrawn into a new window buffer, from which the window compositor 4 then writes the new version of the window to the displays frame buffer 5.

The display frame buffer 5 is then read to display the window 42 on the display 6.

As discussed above, in the present embodiment this process is modified in accordance with the technology described herein to try to identify those regions of a new version of a window in a window buffer that have changed from the previous version of the window in a window buffer, and to then control the writing of the new version of the window from the window buffer to the display frame buffer on that basis.

This is because the Applicants have recognised that it can be common for an updated, new version of a window to have large parts which are the same from one update to the next. For example, there may be a text entry box in the window and the only thing which changes from one version of the window to the next is the cursor as it flashes.

Figure 2:
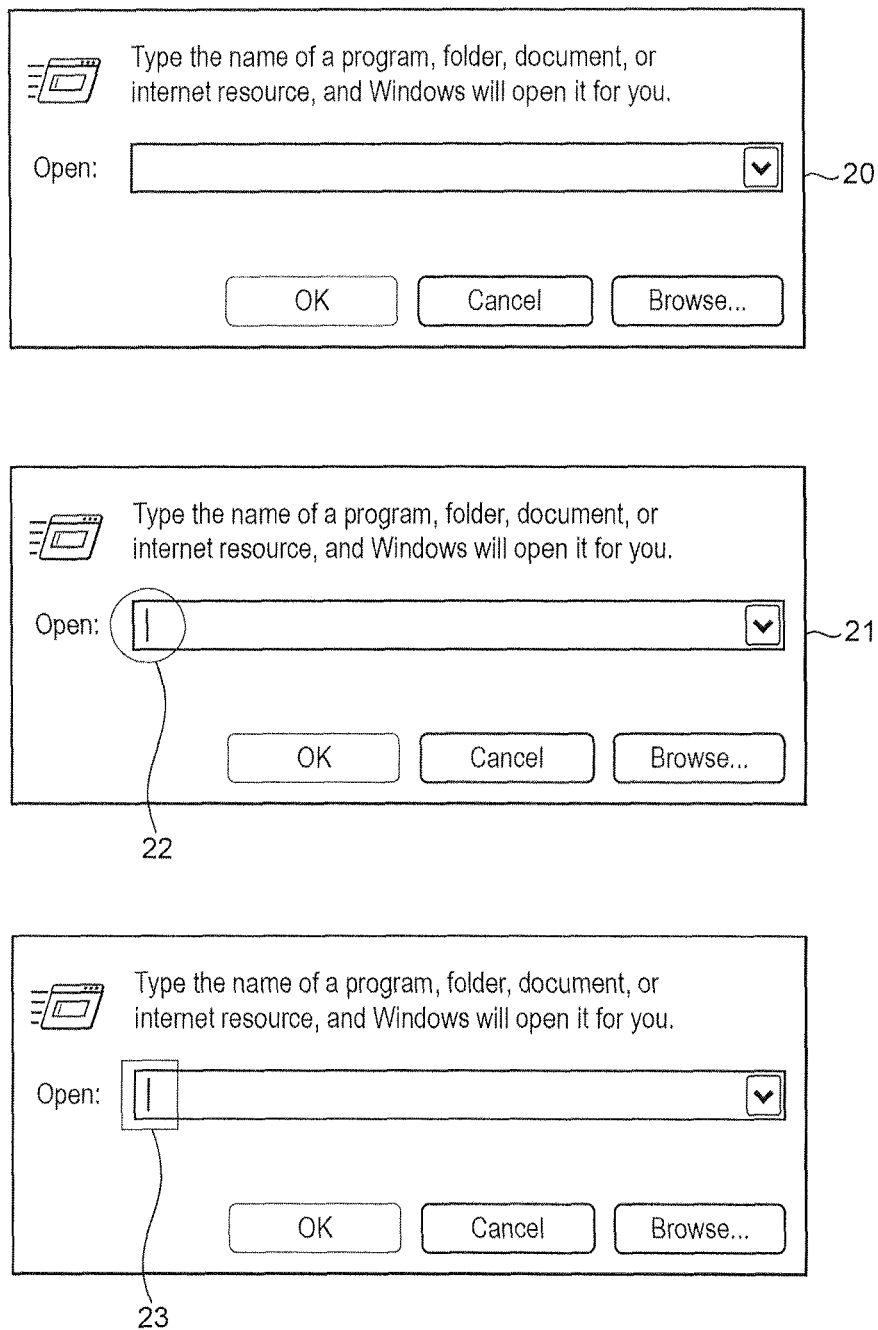
FIGS. 2 and 3 illustrate the principles of the operation of an embodiment of the technology described herein.

FIG. 2 illustrates this and shows a first version of a window 20 in which the cursor does not appear, and then the next version of the window 21 in which the cursor 22 does appear. Thus the only region of the window that has changed between the first 20 and second 21 versions of the window is the region 23 (as shown in FIG. 2) in which the cursor 22 appears.

The Applicants have recognised that in these circumstances, the window composition process doesn't need to write the whole of the new version of the window to the displays frame buffer again, but rather only the region 23 which has changed since the previous update needs to be written to the display's frame buffer.

In the present embodiment, the regions of a window that have changed from one version of the window to the next are identified by considering the content of each rendering tile that is generated by the graphics processing system when rendering the window into the window buffer.

Figure 3:
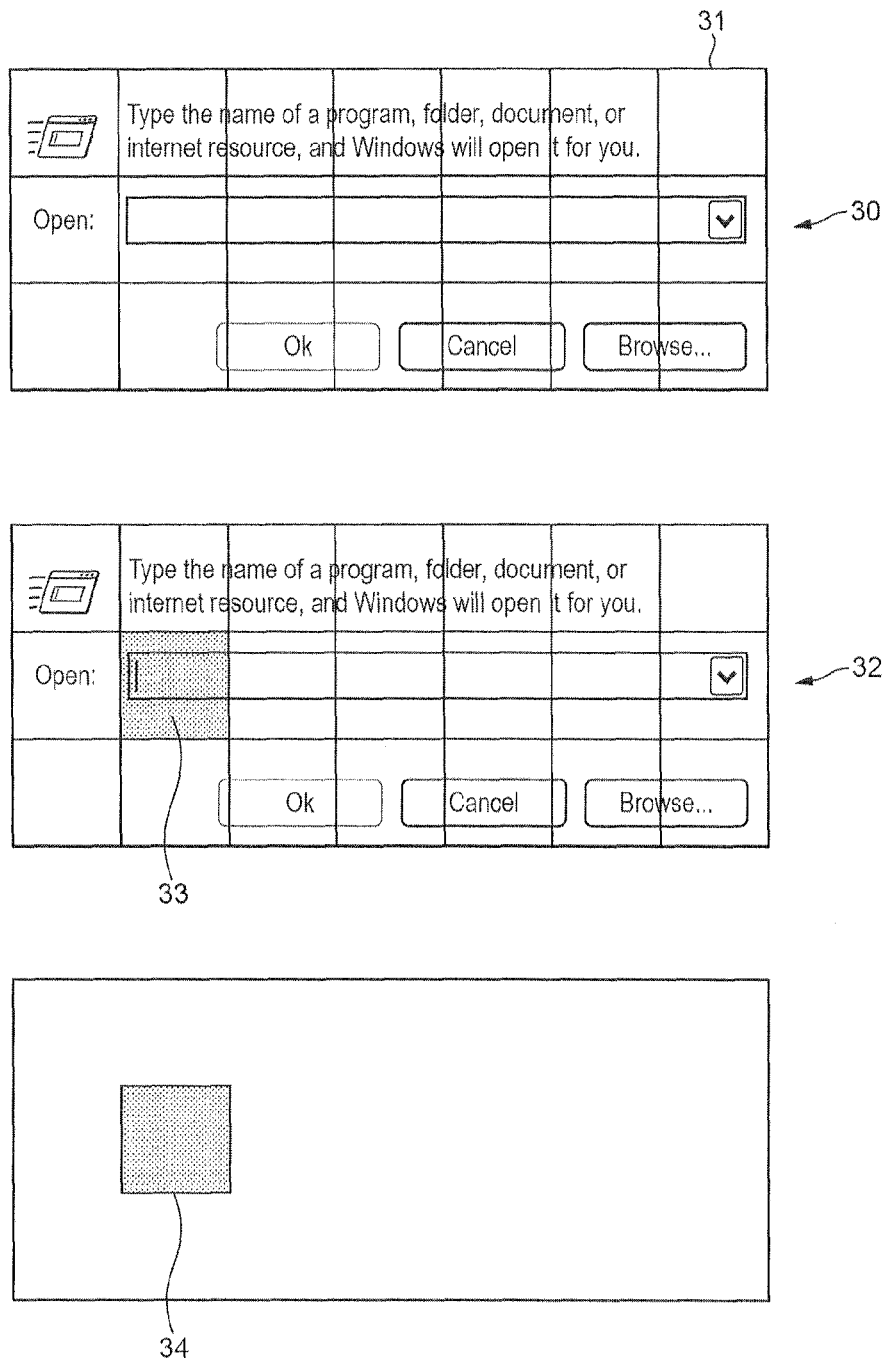

FIG. 3 illustrates this, and shows a window 30 stored in a window buffer with the array of rendering tiles 31 that have been used to generate the window overlaid on it.

Figure 5:
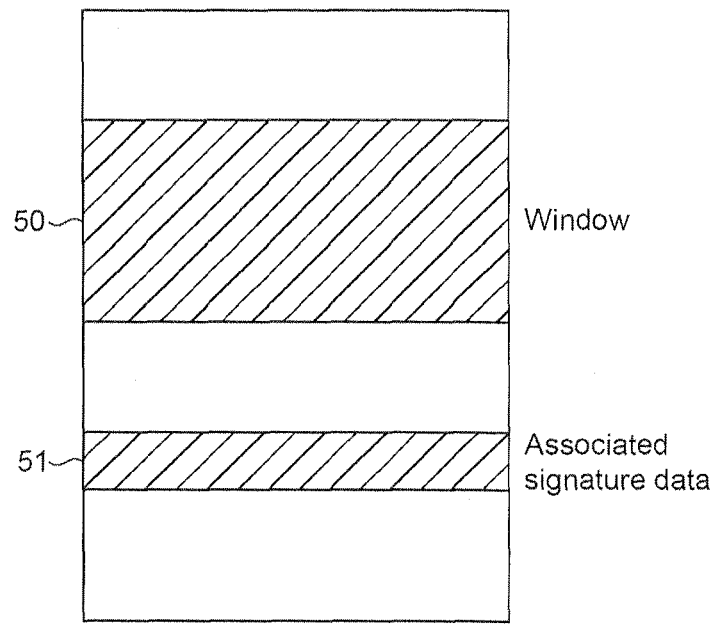
FIG. 5 shows schematically how the relevant data is stored in memory in the first embodiment of the technology described herein.

In the present embodiment, a signature value representative of the content of each tile for a given version of a window in the window buffer is derived from the tile's pixel data. The set of tile signature values is then associated with the window (the window buffer) to which it relates. FIG. 5 shows an exemplary memory layout for this, in which the tiles making up the window in the window buffer are stored in one portion 50 of memory (thus forming the "window buffer") and the associated signatures for the tiles making up the window are stored in another portion 51 of the memory. (Other arrangements would, of course, be possible.) This is done for each version of the window that is generated.

In the example shown in FIG. 3, the signature of the tile 33 where the cursor now appears (i.e. the tile that has changed in the new, updated version of the window 32 in a window buffer) will be different to the signature in that tile for the previous version 30 of the window in a window buffer (as the tile's content has changed). Thus a comparison of the signature values for the tile 33 in the existing 30 and new 32 versions of the window in the window buffers will show that the tiles differ, which is then taken as an indication that the content of the tile 33 has changed in the new version 32 of the window and so needs updating to the display frame buffer 5.

In response to this comparison result, as shown in FIG. 3, an indication of the area 34 (which corresponds to the position of the tile 33) which needs to be updated into the display frame buffer is derived and provided to the window compositor 4 so that the window compositor can write only the appropriate updated region 34 of the new version 32 of the window from the window buffer to the display frame buffer 5.

Figure 4:
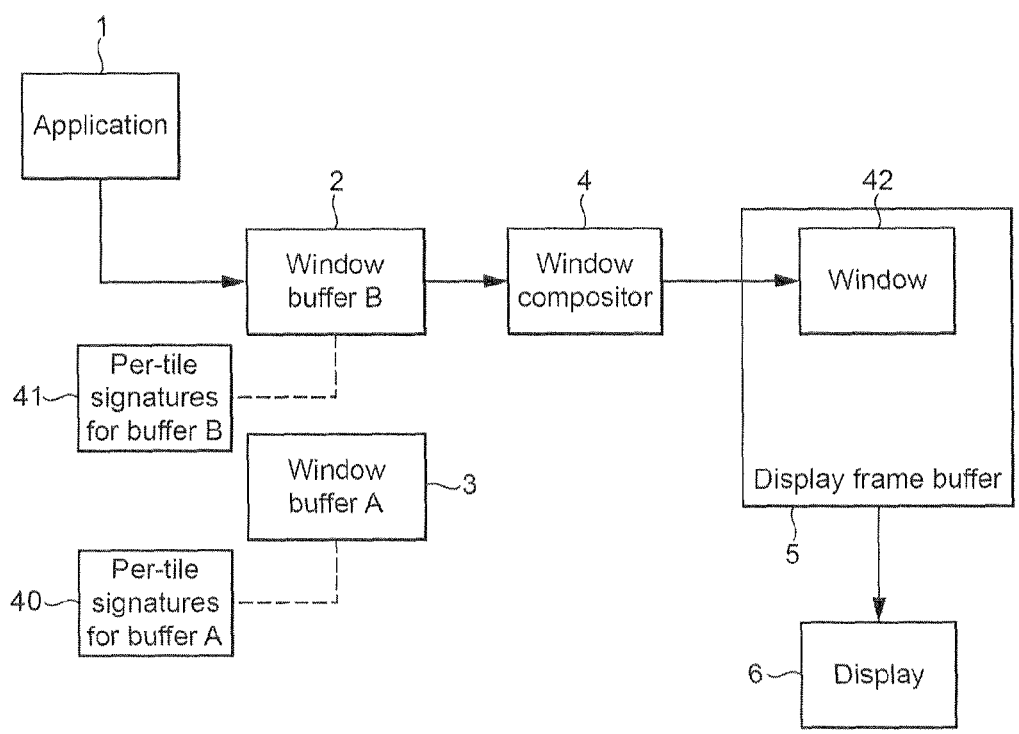
FIG. 4 shows schematically an embodiment of the technology described herein.

FIG. 4 shows schematically this operation in a system corresponding to that illustrated in FIG. 1.

As shown in FIG. 4, as a respective version of the window for the application 1 is written into a window buffer, a corresponding set of per tile signatures indicative of the content of each respective tile in the window buffer is stored in association with the corresponding window buffer.

Then, when an updated version of a window is stored into a window buffer, an algorithm is used to iterate over the two sets of signature values (i.e. the set of signature values for the updated version of the window buffer and the set of signature values for the previous window buffer (for the previous version of the window) that has already been written to the display frame buffer 5), to determine which tiles are different in the two versions of the window by comparing the signatures of each respective tile (for each respective tile position) in turn.

Then, as the size and location of each tile in the window buffer is known, the set of tiles which are found to be different can be used to generate a region or set of regions for the window compositor 4 to write to the window 42 in the display frame buffer 5 in order to update the window 42 in the display frame buffer 5 to display the new version of the window on the display 6. There could, e.g., be one region for each tile which is different in the two buffers, or, for example, where two or more adjacent tiles have changes, the two or more adjacent tiles could be combined into a single, larger region to be updated (e.g. which covers all the adjacent tiles that have changed). Any desired and suitable combination of regions and relationships of regions to tiles can be used, as desired.

By way of illustration, let it be assumed in FIG. 4 that the version of the window that has been rendered into window buffer A 3 (which has a set of corresponding per tile signatures stored in a separate buffer 40), is the version of the window that is currently being displayed. (In other words, the window compositor 4 has written the window buffer A 3 to the area of the display frame buffer 5 occupied by the window 42, such that the window 42 in the display frame buffer 5 corresponds to the content of the window buffer A 3.)

If the window for the application 1 is then updated, the new version of the window is drawn into a new window buffer B 2, and a corresponding set of per-tile signatures for the new version of the window are calculated and stored in another separate signature buffer 41 that is associated with the window buffer B 2.

Next, the per-tile signatures for the new version of the window stored in the window buffer B 2 are compared with the per-tile signature values for the existing version of the window that has been written to the display frame buffer 5 (i.e. with the per-tile signatures 40 for the window buffer A 3). This comparison may be done, for example, by the application itself, by the window compositor 4, or by any other suitable element or component of the system. The comparison may, e.g., be done as the new tiles are written to the new window buffer, or after the new window buffer has been filled, or in any other suitable manner.

As discussed above, the comparison iterates over the two sets of signature values for the two versions of the window and determines which tiles are different in the two versions of the window by comparing the signatures for each respective tile position in turn. Then, only the window regions in the new version of the window which correspond to tiles with different signatures are written from the window buffer B 2 that contains the new version of the window to the window 42 in the display frame buffer 5 by the window compositor 4 in order to update the window on the display 6.

As well as updating the window in the frame buffer, the set of content-indicating signatures for the window from which the window 42 in the frame buffer 5 has effectively been drawn needs to be retained (for comparison with future versions of the window). In the present embodiment, this is done by retaining the per-tile signature buffer 41 for the new version of the window, as being the set of signatures representing the content of the window that was drawn to the frame buffer 5.

It would also be possible to have an, e.g., dedicated "current window" per-tile signature buffer which always maintains the set of signatures for the window from which the window in the frame buffer was drawn. In this case, as the window in the frame buffer is updated with the appropriate regions for the new version of the window, the set of signatures or other content-indicating information in the "current window" signature buffer should correspondingly be updated with the new signatures (or other content indicating information) for the regions of the new version of the window that are being written to the frame buffer. This can be done, for example, by updating the signature (or other content indicating information) in the set of that information in the "current window" signature buffer for those regions of the window that have been updated in the frame buffer, or, for example, the complete set of signatures (or other content-indicating information) for the new version of the window could simply be retained as, or copied to, the "current window" signature buffer.

In this embodiment, it is assumed that the window compositor 4 is, as is known in the art, a separate process running in the system which copies window buffers from several applications in the system. The window compositor 4 may use alpha-blending, transformations or other techniques rather than straight copies when writing a window to a display frame buffer 5, if desired. The technology described herein can also be used when the application 1 itself is responsible for writing its own window buffers to the display frame buffer 5.

Although the above embodiment is described as operating such that if the tile signatures differ as between the two versions of the window, that region of the window is then identified as needing to be updated to the display frame buffer, the system could also instead operate to identify those tiles for which the two signature values match (in which case the tile in the new version of the window can be considered to be identical to the tile in the previous version of the window), such that that tile does not need writing to the display frame buffer again (i.e. the region of the tile can be subtracted from the parts of the new version of the window that are written (updated) to the display frame buffer).

As discussed above, in the present embodiment, if the tiles' signatures match, it is then assumed that the new tile is the same as the tile already written to the frame buffer, and so the system abstains from writing the new tile to the frame buffer. In this way, the present embodiment can avoid write traffic and processing for sections of the frame buffer that don't actually change from one version of a window to the next (in the case of a game, this would typically be the case for much of the user interface, the sky, etc., as well as most of the playfield when the camera position is static). This can save a significant amount of bandwidth and power consumption in relation to the frame buffer operation. (On the other hand, if the tiles' signatures do not match, then the new tile is written to the frame buffer.)

The process is then repeated when a new version of the window for the application 1 is generated and written to a window buffer (although in this case, the previous version of the window will then be represented by the per-tile signature buffer 41 for the window buffer B 2), and so on, as new versions of the window are generated.

Once a given window or the changed parts of that window have been written to the corresponding window in the frame buffer, then it would be possible to retain that version of the window in a window buffer, for example for comparison with the next version of the window that is generated. However, where information, such as signatures, representative of the content of the window are used for the comparison process, it is only necessary to retain the "signature" information for the window that has been written to the frame buffer, and not the actual content of that window in a window buffer (since the window buffer's content has already been written to the window in the frame buffer).

Thus, in an embodiment, once the frame buffer contains the new version of a window, that window is allowed to be overwritten in the window buffer. In these cases, however, as discussed above, a set of window region "signatures" (or other information indicative of the content of the window) for the window that was written to the frame buffer (for the window from which the frame buffer has been drawn) is still maintained, in order that it may be compared with the set of "content" signatures (or other information indicative of the content of a window) for any new version of the window that is generated (has been written to a window buffer).

The generation of the per-tile signatures for the versions of the window in the present embodiments will now be described in more detail.

Figure 6:
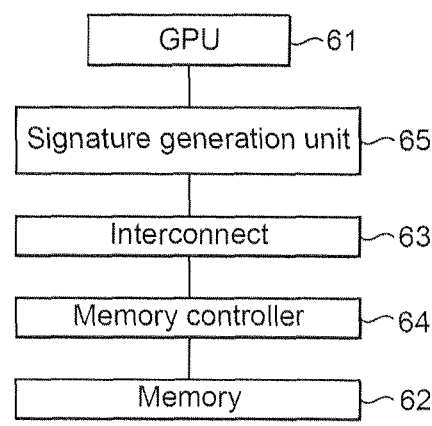
FIG. 6 shows schematically an embodiment in which the technology described herein is used in conjunction with a tile-based graphics processor.

In the present embodiments, the windows to be displayed are generated by a graphics processing system. FIG. 6 shows schematically an arrangement of a graphics processing system that can be used in embodiments of the technology described herein.

The graphics processing system includes, as shown in FIG. 6, a tile-based graphics processor or graphics processing unit (GPU) 61, which, as is known in the art, produces tiles of a window to be displayed.

As is known in the art, in such an arrangement, once a tile has been generated by the graphics processor 61, it would then normally be written to a window buffer in memory 62, e.g., via an interconnect 63 which is connected to a memory controller 64. Sometime later the window buffer will be written, as discussed above, to a frame buffer for display on a display.

In the present embodiment, this process is modified by the use of a signature generation hardware unit 65. In essence, and as will be discussed in more detail below, the signature generation unit 65 operates to generate for each tile a signature representative of the content of the tile.

Figure 7:
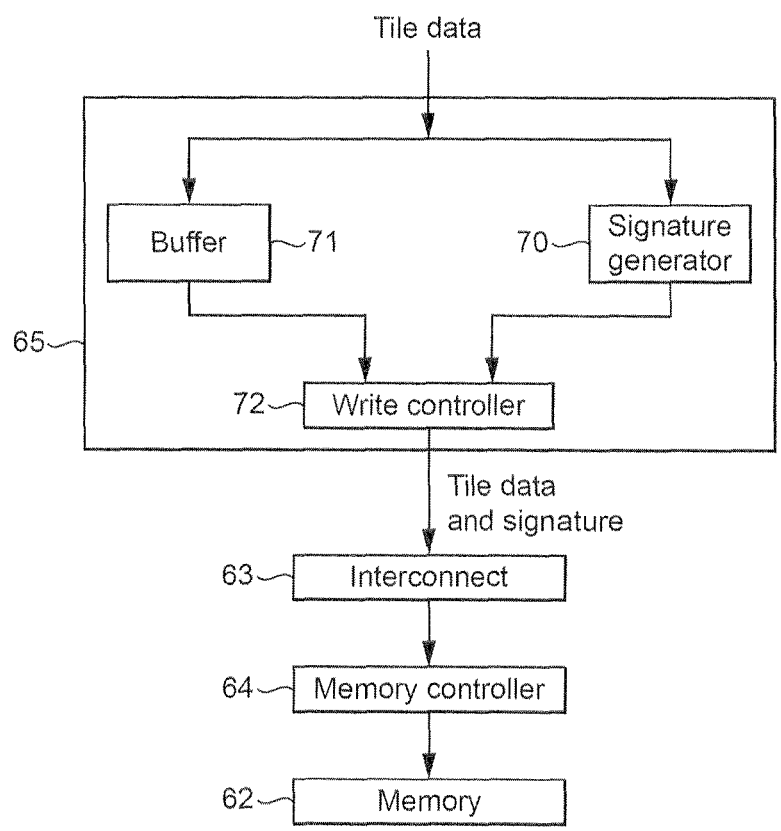
FIG. 7 shows schematically and in more detail the signature generation unit of the embodiment shown in FIG. 6.

FIG. 7 shows the signature generation unit 65 in more detail.

As shown in FIG. 7, tile data is received by the signature generation unit 5 from the graphics processor 61 and is passed both to a buffer 71 which temporarily stores the tile data while the signature generation process takes place, and a signature generator 70.

The signature generator 70 operates to generate the necessary signature for the tile. In the present embodiment the signature is in the form of a 32-bit CRC for the tile.

Other signature generation functions and other forms of signature such as hash functions, etc., could also or instead be used, if desired. It would also, for example, be possible to generate a single signature for an RGBA tile, or a separate signature for each colour plane. Similarly, colour conversion could be performed and a separate signature generated for each of Y, U and V. In order to reduce power consumption, the tile data processed in by the signature generator 70 could be reordered (e.g. using the Hilbert curve), if desired.

Once the signature for the new tile has been generated, it is stored, as discussed above, in a per-tile signature buffer that is associated with the version of the window in question in the memory 62, under the control of a write controller 72. The corresponding tile data is also stored in the appropriate window buffer in the memory 62.

In the present embodiments, to stop incorrectly matched tiles from existing for too long a long period of time in the frame buffer 5, the signature comparison for each tile for a window in the frame buffer is periodically disabled (preferably once a second). This then means that when a tile whose signature comparison has been disabled is newly generated, the newly generated tile will inevitably be written to the frame buffer in the memory 2. In this way, it can be ensured that mismatched tiles will over time always be replaced with completely new (and therefore correct) tiles. (With random tiles, a 32-bit CRC, for example, will generate a false match (i.e. a situation where the same signature is generated for tiles having different content) once every $2^{32}$ tiles, which at 1080 HD resolution at 30 frames per second would amount to a tile mismatch due to the comparison process about every 4 hours.)

In the present embodiments, the tiles' signature comparisons are disabled in a predetermined, cyclic, sequence, so that each second (and/or over a set of say, 25 or 30 frames), each individual tile in the window will have its signature comparison disabled (and hence a new tile will be written to the frame buffer for that tile position) once.

Other arrangements would be possible. For example, the system could simply be arranged to write out a completely new frame periodically (e.g. once a second), in a similar way to MPEG video. Additionally or alternatively, longer signatures could be used for each tile, as that should then reduce significantly the rate at which any false tile matches due to identical signatures for in fact different tiles occur. For example, a larger CRC such as a 64-bit CRC could reduce such mismatches to once every 1.2 million years.

(Alternatively, as any such false tile matches are unlikely to be perceptible due to the fact that the tiles will in any event still be similar, it may be decided that no precautions in this regard are necessary.)

It would also be possible to, for example, weight the signature generation to those aspects of a tile's content that are considered to be more important (e.g. in terms of how the user perceives the final displayed tile). For example, a longer signature could be generated for the MSB bits of a colour as compared to the LSB bits of a colour (as in general the LSB bits of a colour are less important than the MSB bits). The length of the signature could also be adapted in use, e.g., depending upon the application, to help minimise power consumption.

In an embodiment, the data block signatures that are generated are "salted" (i.e. have another number (a salt value) added to the generated signature value) when they are created. The salt value may conveniently be, e.g., a random value. This will, as is known in the art, help to make any error caused by any inaccuracies in the comparison process non-deterministic (i.e. avoid, for example, the error always occurring at the same point for repeated viewings of a given sequence of images such as, for example, where the process is being used to display a film or television programme).

In one embodiment, the tile comparison process is carried out for each and every tile that is generated for a window. However, in another embodiment, an adaptive scheme is used where fewer tiles are analysed when there is expected to be little correlation between successive versions of a window. In this arrangement, the historic number of tile matches is used as a measure of the correlation between the versions of the window (since if there are a lot of tile matches, there can be assumed to be a lot of correlation between the windows, and vice-versa).

Thus, in this case, when it is determined that there is a lot of correlation between the different versions of the window (i.e. many of the tiles are matched to tiles already written to the frame buffer), then signatures are generated and comparisons carried out for all of the tiles, whereas when it is determined that there is little correlation between successive windows (such that few or no tiles have been found to match to tiles already written to the display frame buffer), then signatures are generated and the tile comparison process performed for fewer tiles.

Figure 8A:
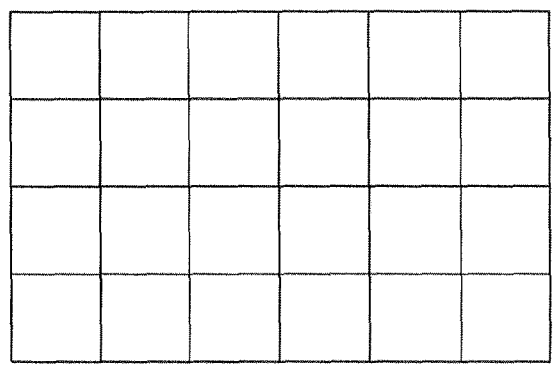
FIGS. 8a and 8b show schematically possible modifications to the operation of an embodiment of the technology described herein.
Figure 8B:
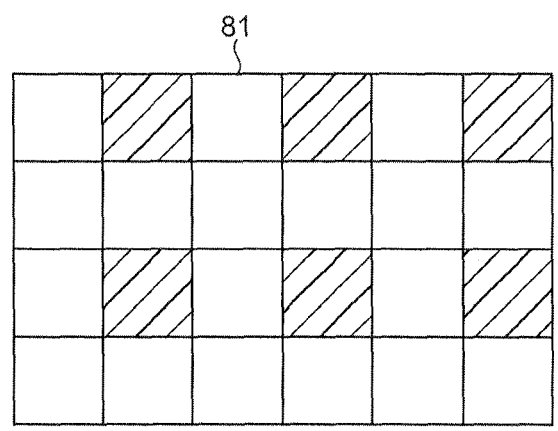

FIG. 8 illustrates this. FIG. 8a shows the case where there is a lot of correlation between successive versions of a window and so signatures are generated for all tiles. FIG. 8b shows the converse situation where there is little correlation between successive versions of a window, and so in this case signatures are generated and compared for only a subset 81 of the tiles.

It would also be possible to use these principles to, for example, try to determine which particular portions of the window have a higher correlation, and then increase the number of tiles that are subject to the comparison in particular regions of the window only, if desired.

A number of other alternatives and arrangements of the above embodiments and of the technology described herein could be used if desired.

For example, it would be possible to provide hardware registers that enable/disable the tile signature calculations for particular window regions, such that the signature generation and comparison is only performed for a tile if the register for the window region in which the tile resides is set.

The driver for the graphics processor (for example) could then be configured to allow software applications to access and set these tile signature enable/disable registers, thereby giving the software application the opportunity to control directly whether or not and where (for which window regions) the signature generation and comparisons take place. This would allow a software application to, for example, control how and whether the signature calculation and comparison is performed. This could then be used, e.g., to eliminate the power consumed by the signature calculation for a region of the window the application "knows" will be always updated (with the system then always updating such regions of the window without performing any signature check first).

The number of such registers may chosen, for example, as a trade-off between the extra logic required implementing and using them and the desired granularity of control.

Although the present embodiments have been described above, inter alia, with reference to the comparison of rendered tiles written to the window buffer, as discussed herein, it is not necessary that the sub-regions of the window that are compared (and e.g. have signatures generated for them) correspond exactly to rendered tiles generated by the graphics processor.

For example, the window sub-regions that are considered and compared could be made up of plural rendered tiles and/or could comprise sub-portions of a rendered tile. Indeed, different sub-region sizes may be used for different regions of the same window and/or the sub-region size and shape could be adaptively changed, e.g. depending upon the write transaction elimination rate, if desired.

Where a sub-region size that does not correspond exactly to the size of a rendered tile is being used, then the signature generation unit 65 may conveniently be configured to, in effect, assemble or generate the appropriate sub-regions (and, signatures for those sub-regions) from the data, such as the rendered tiles, that it receives from the graphics processor.

Although the technology described herein has been described above primarily with reference to comparing one newly generated window with the window that has been written to (that has been used to draw) the frame buffer, as will be appreciated by those skilled in the art, this process can be, and preferably is, repeated for plural versions of a given window that are being generated (and as they are generated), and most preferably as each successive new version of the window is generated.

Furthermore, where there are plural different windows being generated for a given frame buffer, the technology described herein can be used for any or all of those windows as desired. Thus, in an embodiment, the technology described herein is applied to each of plural windows that are being generated for a given frame buffer, and, most preferably, in respect of each window that is being generated for a given frame buffer. In this case, each individual window will be processed in the manner of the present embodiment, and then, as is known in the art, the different windows will then be composed into the frame buffer in an appropriate manner.

It can be seen from the above that the technology described herein, in its embodiments at least, can help to reduce, for example, power consumption and memory bandwidth in a compositing window system. It can also reduce the amount of processing that is required where the windows are blended and/or transformed, etc., when they are written to the frame buffer.

This is achieved, in the embodiments of the technology described herein at least, by eliminating unnecessary framebuffer memory transactions. This reduces the amount of data that is rendered to the frame buffer, thereby significantly reducing system power consumption and the amount of memory bandwidth consumed.

What is claimed is:

1. A method of displaying windows on a display, comprising:
   writing windows to be displayed to respective window buffers for storing the windows when the windows are generated; and
   then writing the windows from their respective window buffers to a frame buffer to combine the windows for display; the method further comprising:
   when a new version of a window to be displayed is generated and stored in a window buffer for writing to and combining in the frame buffer:
   comparing the content of the new version of said window in the window buffer to the content of the version of said window in the window buffer that was written to and combined in the frame buffer to show said window in its current form on the display;
   using said comparison of the content of the new version of said window in the window buffer to the content of the version of said window in the window buffer that was written to and combined in the frame buffer to show said window in its current form on the display to identify regions of the version of said window in the window buffer that was written to and combined in the frame buffer whose content has changed in the new version of said window; and
   determining the regions of the new version of said window to write to the frame buffer in order to display the new version of said window on the display on the basis of those regions of the new version of said window that have been identified as having changed content using said comparison of the content of the new version of said window in the window buffer to the content of the version of said window in the window buffer that was written to and combined in the frame buffer to show said window in its current form on the display.

2. The method of claim 1, wherein the comparison is performed by comparing information representative of or derived from the content of the versions of said window.

3. The method of claim 1, wherein the versions of said window are divided into respective sets of sub-regions, and said comparison is done by comparing corresponding sub-regions from each version of said window to determine if the content of the sub-region has changed in the new version of said window or not.

4. The method of claim 3, wherein the window sub-regions that are compared correspond to rendered tiles that a graphics processor that is generating the versions of said window produces as its rendering output.

5. The method of claim 3, wherein the comparison process comprises comparing signatures representative of the content of the respective window version sub-regions.

6. The method of claim 3, wherein the comparison is carried out in respect of some but not all of the sub-regions that the versions of said window are divided into.

7. The method of claim 1, comprising:
   using the identification of those window regions whose content has changed to determine a region or regions of the new version of said window that should be written to the frame buffer, and providing information indicating those regions to the frame buffer composing process.

8. The method of claim 1 comprising carrying out the comparison process and determining the regions of the new version of a window to write to the frame buffer in order to display the new version of the window on the display on the basis of those regions of the new version of the window that have been identified as having changed content using the comparison, for at least two of the plural different windows that are being generated for the frame buffer.

9. The method of claim 1, comprising periodically always writing newly generated window data to the frame buffer in respect of each region of said window.

10. An apparatus for displaying windows on a display, comprising:
    a plurality of window buffers;
    a frame buffer;
    processing circuitry configured to write windows to be displayed to respective window buffers of the plurality of window buffers for storing the windows when the windows are generated; and
    processing circuitry configured to write the windows from their respective window buffers to the frame buffer to combine the windows for display; the apparatus further comprising:
    processing circuitry configured to, when a new version of a window to be displayed is generated and stored in a window buffer for writing to and combining in the frame buffer, compare the content of the new version of said window in the window buffer to the content of the version of said window in the window buffer that was written to and combined in the frame buffer to show said window in its current form on the display;
    processing circuitry configured to use said comparison of the content of the new version of said window in the window buffer to the content of the version of said window in the window buffer that was written to and combined in the frame buffer to show said window in its current form on the display to identify regions of the version of said window in the window buffer that was written to and combined in the frame buffer whose content has changed in the new version of said window; and
    processing circuitry configured to determine the regions of the new version of said window to write to the frame buffer in order to display the new version of said window on a display on the basis of those regions of the new version of said window that have been identified as having changed content by the processing circuitry configured to use said comparison of the content of the new version of said window in the window buffer to the content of the version of said window in the window buffer that was written to and combined in the frame buffer to show said window in its current form on the display to identify regions of the window that have changed in the new version of said window.

11. The apparatus of claim 10, wherein the comparison is performed by comparing information representative of or derived from the content of the versions of said window.

12. The apparatus of claim 10, wherein the versions of said window are divided into respective sets of sub-regions, and said comparison is done by comparing corresponding sub-regions from each version of said window to determine if the content of the sub-region has changed in the new version of said window or not.

13. The apparatus of claim 12, wherein the window sub-regions that are compared correspond to rendered tiles that a graphics processor that is generating the versions of said window produces as its rendering output.

14. The apparatus of claim 12, wherein the processing circuitry configured to compare the content of the new version of said window in the window buffer to the content of the version of said window in the window buffer that was written to and combined in the frame buffer to show said window in its current form on the display is configured to compare signatures representative of the content of the respective window version sub-regions.

15. The apparatus of claim 12, further comprising processing circuitry configured to select the number of window sub-regions that are to be compared for a given version of a window.

16. The apparatus of claim 10, comprising:
processing circuitry configured to use the identification of those window regions whose content has changed to determine the region or regions of the new version of said window that should be written to the frame buffer; and
processing circuitry configured to provide information indicating those regions to the frame buffer composing process.

17. The apparatus of claim 10, wherein the apparatus comprises processing circuitry configured to carry out the comparison process and to determine the regions of the new version of a window to write to the frame buffer in order to display the new version of the window on the display on the basis of those regions of the new version of the window that have been identified as having changed content using the comparison, for at least two different windows that are being generated for a frame buffer.

18. The apparatus of claim 10, wherein the apparatus is configured to always write newly generated window data to the frame buffer periodically in respect of each region of said window.

19. A non-transitory, computer readable storage medium storing computer software code which when executing on one or more processors performs a method of displaying windows on a display comprising:
writing windows to be displayed to respective window buffers for storing the windows when the windows are generated; and
then writing the windows from their respective window buffers to a frame buffer to combine the windows for display; the method further comprising:
when a new version of a window to be displayed is generated and stored in a window buffer for writing to and combining in the frame buffer:
comparing the content of the new version of said window in the window buffer to the content of the version of said window in the window buffer that was written to and combined in the frame buffer to show said window in its current form on the display;
using said comparison of the content of the new version of said window in the window buffer to the content of the version of said window in the window buffer that was written to and combined in the frame buffer to show said window in its current form on the display to identify regions of the version of said window in the window buffer that was written to and combined in the frame buffer whose content has changed in the new version of said window; and
determining the regions of the new version of said window to write to the frame buffer in order to display the new version of said window on the display on the basis of those regions of the new version of said window that have been identified as having changed content using said comparison of the content of the new version of said window in the window buffer to the content of the version of said window in the window buffer that was written to and combined in the frame buffer to show said window in its current form on the display.

* * * * *